United States Patent [19]

Morgan et al.

[11] Patent Number: 5,319,001
[45] Date of Patent: Jun. 7, 1994

[54] COLOURED POWDER COATING COMPOSITIONS

[75] Inventors: Andrew R. Morgan, Low Fell; John D. Sinclair-Day, Greenside; Timothy M. Handyside, High West, all of United Kingdom

[73] Assignee: Courtaulds Coating (Holdings) United, London, England

[21] Appl. No.: 687,901
[22] PCT Filed: Nov. 30, 1989
[86] PCT No.: PCT/GB89/01432
  § 371 Date: Jul. 25, 1991
  § 102(e) Date: Jul. 25, 1991
[87] PCT Pub. No.: WO90/06345
  PCT Pub. Date: Jun. 14, 1990

[30] Foreign Application Priority Data

Dec. 2, 1988 [GB] United Kingdom ............... 8828225

[51] Int. Cl.⁵ .................... C09C 3/10; C09D 5/03; C08J 3/20
[52] U.S. Cl. ................... 523/205; 523/204; 523/206; 523/207; 523/220; 428/407
[58] Field of Search ............ 523/204, 205, 206, 207, 523/220; 428/407

[56] References Cited

U.S. PATENT DOCUMENTS

| Re. 28,361 | 3/1975 | Hahn | 428/407 |
|---|---|---|---|
| 3,843,571 | 10/1974 | Fitzgerald | 523/220 |
| 3,909,282 | 9/1975 | Gray | 106/288 |
| 3,939,114 | 2/1976 | Camelon et al. | 260/42.14 |
| 3,941,904 | 3/1976 | Hoh et al. | 427/207 |
| 3,972,844 | 8/1976 | Morosawa et al. | 260/16 |
| 3,980,607 | 9/1976 | Johannes | 260/37 EP |
| 4,169,737 | 10/1979 | Burke, Jr. et al. | 523/201 |
| 4,242,253 | 12/1980 | Yallourakis | 260/40 TN |
| 4,260,066 | 4/1981 | Hannon et al. | 215/12 R |
| 4,543,313 | 9/1985 | Mahabadi et al. | 430/109 |

FOREIGN PATENT DOCUMENTS

| 250183 | 12/1987 | European Pat. Off. . |
|---|---|---|
| 312331 | 4/1989 | European Pat. Off. . |
| 372860 | 6/1990 | European Pat. Off. . |
| 372958 | 6/1990 | European Pat. Off. . |
| 389080 | 9/1990 | European Pat. Off. . |
| 2147653 | 4/1973 | Fed. Rep. of Germany . |
| 2190874 | 2/1974 | France . |
| 2245744 | 4/1975 | France . |
| 2310394 | 12/1976 | France . |
| 48-7686 | of 1973 | Japan . |
| 48-74922 | of 1973 | Japan . |
| 2-26659 | of 1990 | Japan . |
| 1383602 | 2/1973 | United Kingdom . |
| 1377780 | 12/1974 | United Kingdom . |
| 1387791 | 3/1975 | United Kingdom . |
| 1485388 | 9/1977 | United Kingdom . |
| 1512495 | 6/1978 | United Kingdom . |
| 2026506A | 2/1980 | United Kingdom . |
| 2226824A | 7/1990 | United Kingdom . |

OTHER PUBLICATIONS

Greenhalgh, W., Polymer Paint & Colour Journal, Sep. 19, 1979, p. 920.
Bine, Thermoset Powder Coatings, ed. J. Ward, FMJ International Publications Ltd., 1989, vol. 161, No. 4008, pp. 26–28.
Carter, K. S., Polymer Paint & Colour Journal, Nov. 12, 1986, vol. 176, No. 4179.

Primary Examiner—Paul R. Michl
Assistant Examiner—Andrew E. C. Merriam
Attorney, Agent, or Firm—Pennie & Edmonds

[57] ABSTRACT

A coloured powder coating composition consists of solid particles, each of which comprises a solid polymeric binder system and at least a majority of which contain at least one colouring agent. The composition is a mixture of particles of at least two different colours. The size of the particles is sufficiently low that when the powder coating is applied to a substrate and heated to form a continuous coating the differences in colour in the cured powder coating arising from the different coloured particles cannot be discerned by the human eye. The size of the particles is preferably below 10 microns in the largest dimension. The particles are preferably agglomerated into composite particles of mean particle size 15 to 75 microns for application by electrostatic spray.

12 Claims, 4 Drawing Sheets

COLOURED POWDER COATING COMPOSITIONS

FIELD OF THE INVENTION

This invention relates to coloured powder coatings. Powder coating compositions generally comorise a solid film-forming resin, usually with one or more pigments. They can be thermoplastic but are more usually thermosetting, incorporating two co-reactive film-forming resins or incorporating a curing agent for the film-forming resin in the powder particles. Powder coating compositions are generally prepared by intimately mixing the ingredients, for example in an extruder at a temperature above the softening point of the film-forming resin but below the curing temperature, and comminuting the mixture to the desires particle size. The powder coating is usually apelied by electrostatic spray, and the particle size required for most commercial electrostatic spray apparatus is a mean particle size of 15-75 microns. preferably 25-50 microns. In the electrostatic spray process the powder coating particles are electrostatically chargea by the spray gun and the substrate is earthed or oppositely charged. The powder coating particles which do not adhere to the substrate can be recovered for re-use so that powder coatings are economical in use of ingredients as well as non-polluting.

Powder coatings form a rapidly growing sector of the coatings market. One disadvantage of powder coating compositions is that it is difficult to produce small batches of any particular shade rapidly. Improvements in pigment dispersion techniques have made available fluid concentrated colour dispersions which can be added to a range of colourless or white paint bases to rapidly prepare liquid paint in any shade desired, avoiding the need for a paint store to keep several different types of paint each in a wide variety of shades. Such concentrated colour dispersions cannot readily be mixed into powder coatings. There is a need for a process whereby powcer coatings can be rapidly supplied in a wide variety of shades without tne need to store all the different shades.

PRIOR ART

U.S. Pat. No. 3,843,571 relates to a "metallic glamour" finish applied as a powder coating comprising particles of size 1 to 75 microns, that is passing 200-mesh U.S. Sieve. The powder coating compositions comprise 95.0 to 99.9% by weight powder particles of at least two different colours capable of adhering to one another to form a continuous film when heated to their melt temperature, and 0.1 to 5.0% by weight reflective flakes. The coloured particles consist of 70 to 99.9% by weight film-forming binder and 0.1 to 30% by weight colorant particles.

SUMMARY OF THE INVENTION

A coloured powder coating composition according to the invention consists of solid particles, each of which comprises a solid polymeric binder system and at least the majority of which contain at least one colouring agent, the composition being a mixture of particles of at least two different colours, and the size of the particles being sufficiently low that when the powder coating is applied to a substrate and heated to form a continuous coating the differences in colour in the cured powder coating arising from the different coloured particles cannot be discerned by the human eye.

A process according to the invention for the preparation of a coloured powder coating composition in a desired colour comprises providing powder coating compositions in at least two basic colours, optionally together with an uncoloured powder coating composition, each composition consisting of solid particles and each particle comprising a solid polymeric binder system, the particles of the basic colour compositions also containing a colouring agent, and the compositions having a particle size such that substantially all the particles have their largest dimension below 10 microns, and mixing the powder coating compositions in proportions selected to give a coloured powder coating composition which when applied to a substrate and heated to form a continuous coating forms a film of the desired colour. In a modification of such a procedure, an alternative process according to the invention for the preparation of a coloured powder coating composition in a desired colour comprises providing the said powder coating compositions in at least two basic colours, optionally with the said uncoloured powder coating composition, comminuting the compositions to a particle size such that substantially all the particles have their largest dimension below 10 microns and simultaneously mixing them in proportions selected to give a coloured powder coating composition wnich when applied to a substrate and heated to form a continuous coating forms a film of the desired colour.

In both the above processes the particles of the coloured powder coating composition are preferably agglomerated after mixing to produce composite particles of a particle size suitable for electrostatic spraying of the powder coating, generally a mean oarticle size of 15-75 microns and preferably 25-50 microns. Powder coating compositions of particle size less than 15 microns are not readily fluidised, and in particular are not fluidised by commercial electrostatic spray apparatus.

DETAILED DESCRIPTION

Figure 1:
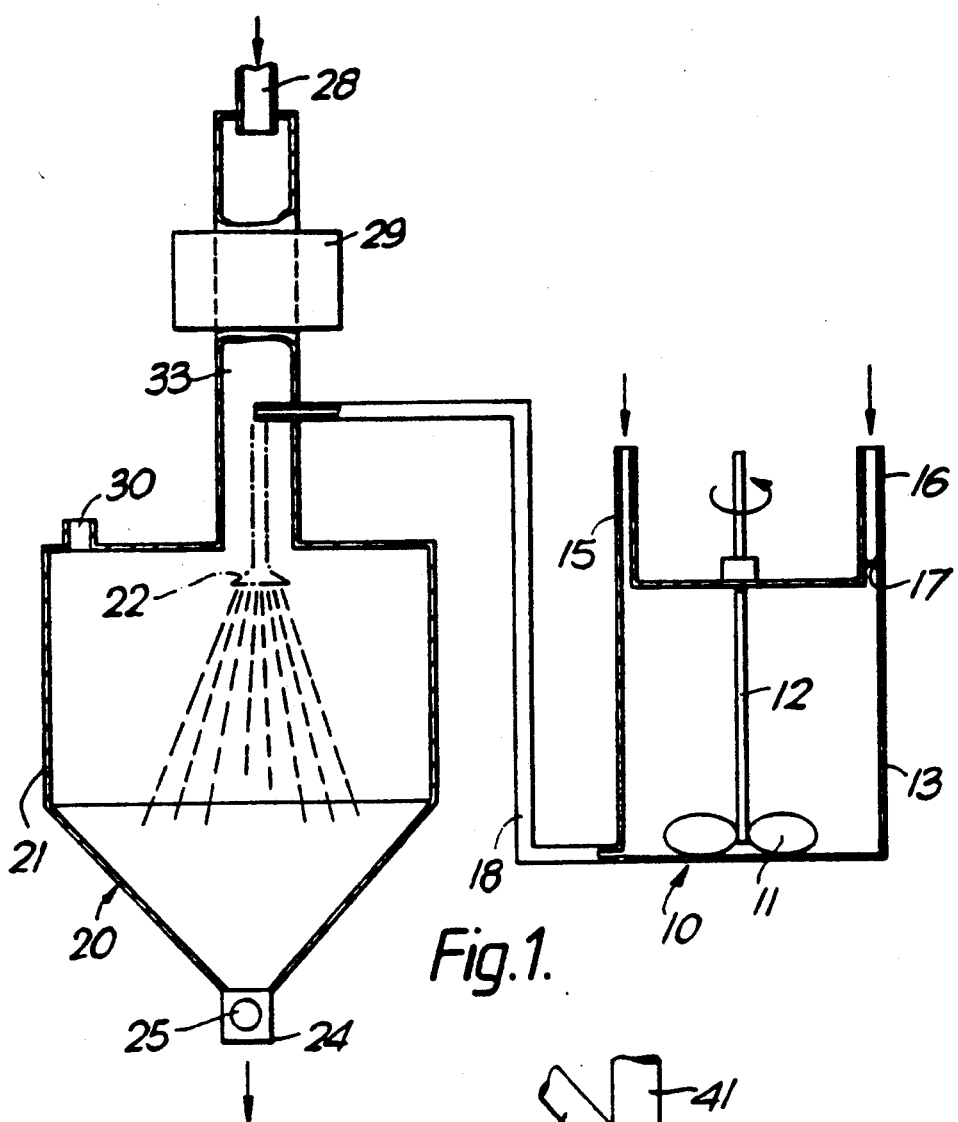
FIG. 1 of the accompanying drawings is a diagrammatic section of an apparatus for producing colour powder coating compositions by dispersion and spray drying.
Figure 2:
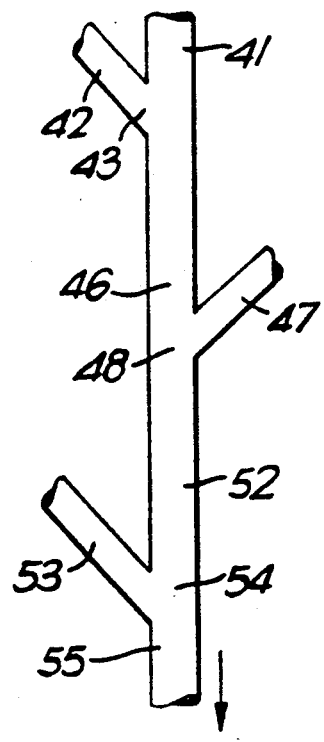
FIG. 2 is a diagrammatic section of an apparatus for mixing basic colour powder coating compositions by electrostatic mixing.

We have found that when a powder coating consisting of different coloured particles is applied to a substrate, each particle retains distinct boundaries even after application to a substrate and heating to form a film. When the largest dimension of the particles of the powder coating composition is below a critical size, generally about 10 microns, the differences in colour in the cured powder coating arising from the different coloured particles cannot be discerned by the eye, so that the powder coating is perceived to have a uniform colour. This critical size is dependent on a number of factors, including the contrast in hue and luminance between the different coloured particles and the ratio of the different coloured particles. Luminance is somewhat more important than hue, so that the critical size is lower for a mixture of black and white particles than for a mixture of different coloured particles of similar luminance. For any pair of coloured powders the critical size is lowest for a 1:1 mixture. The critical size is also very dependent on the nature (randomness) of mixing.

The coating compositions according to the invention may be mixtures of two or more basic colour powder coating compositions, optionally with an uncoloured powder coating composition. The particle size of the basic colour powder coating compositions (and the optional uncoloured composition) is preferably in the range 0.5–15 microns, with the maximum dimension of at least 99% by weight of the particles preferably being in this size range. More preferably, all the particles have a maximum dimension of 10 microns or below. A mean particle size of 1.5–4 microns is most preferred. The individual particles of such a basic colour powoer coating composition each contain tne main ingredients of the powder coating, that is the solid polymeric binder system comprising a film-forming resin and any curing agent required therefor and the colouring agent or agents (pigments and/or dyes) required to give the basic colour. The film-forming resin can be a thermosetting resin or a thermoplastic resin. When a thermosetting resin is used, the solid polymeric binder system generally includes a solid curing agent for the thermosetting resin, alternatively two co-reactive film-forming thermosetting resins can be used.

The basic colour powder coating compositions used to form the mixtures should have similar melting point, melt viscosity, surface tension and other rheological properties to one another so that they flow and level to the same extent when the powder coating is applied to a substrate. All the basic colour powder coating compositions are preferably based on the same binder system; generally they will be of similar composition except for the pigmentation.

The number of basic colours used will usually be in the range 3 to 10; for example, red, yellow, blue, white and black can be used, optionally with an unpigmented powder coating composition of the same particle size. Examples of pigments which can be used in the basic colour powder coating compositions are inorganic pigments such as titanium dioxide white, red and yellow iron oxides, scarlet chrome and chrome yellow, and carbon black, and organic pigments such as phthalocyanine, azo, anthraguinone, thioindigo, isodibenzanthrone, triohendioxane or quinacridone pigments, vat dye pigments or lakes of acid, basic or mordant dyestuffs. Dyes can be used instead of or as well as pigments; for examole 5 basic colour powder coating compositions can be used, comprising compositions dyed cyan, magenta and yellow, and black and white pigmented compositions. Each basic colour powder coating composition can contain a single colorant (pigment or dye) or can contain more than one colorant. It may for example be desirable to include a grey basic colour powder coating composition to avoid the very low particle sizes needed for mixtures of black and white powder, and/or a green powder composition to avoid the very low particle sizes needed for mixtures of blue and yellow. If there is a large demand for off-white shades it may be preferred for economic reasons to include a white basic colour powder coating composition of relatively large particle size, for example 5 to 15 microns.

The powder coating composition can for example be based on a solid oolvmeric binder system comprising a carboxy-functional polyester film-forming resin used with an epoxy-functional curing agent such as an epoxy resin, for example a condensed glycidyl ether of bisphenol A, or a low molecular weight tri-functional epoxy compound such as triglycidyl isocyanurate, or with a beta-hvdroxyalkylamide: or a hydroxy-functional polyester used with an isocyanate-functional curing agent: or an epoxy resin used with an amine-functional curing agent such as dicyandiamide: or a functional acrylic resin, for examole a carboxy, hydroxy-or epoxy-functional resin, used with an appropriate curing agent. The binder can be a thermoplastic resin such as a fluororesin, for example polyyinylidene fluoride or an ethylene/tetrafluoroethylene copolymer, or polyphenylene sulphide. Mixtures of binders can be used, for example a carboxy-functional polyester can be used with a carboxyfunctional acrylic resin and a curing agent such as a betahydroxyalkylamide which serves to cure both polymers. The powder coating composition can contain additives such as a flow-promoting agent, a plasticiser, stabilisers, for example a stabiliser against UV degradation, and/or fillers. All these ingredients are preferably mixed when forming each basic colour powder coating composition.

The basic colour powder coating compositions can be prepared by the methods generally known in the production of powder coatings, but with a final comminution step which produces a low particle size. This comminution is preferably carried out by jet milling in a fluid energy mill. Fluid energy mills function by collision of particles in a high velocity stream of gas, generally air. Particles of diameter less than 5 microns are easily obtained from a feedstock of mean particle size 50 microns. Fluid energy mills have the advantage that the composition is continuously cooled by the gas stream. in an alternative process the composition, preferably at particle size below 500 microns, can be disperses in a non-solvent for the ingredients of the powder coating composition, for example water, and comminuted by techniques known for wet paint, for example a high speed bead mill or ball mill. Conventional comminuting devices using metal shearing blades are less efficient in producing sub-10 micron particles as it is difficult to prevent fusion of the heat-sensitive powder.

The basic colour powder coating compositions can be mixed by various techniques. A preferred method is dry mixing of the powders in a high-shear mixer. The basic colour powders of particle size below 15 microns, for example 0.5 to 10 microns, behave as cohesive non-aeratable powders. Devices containing a high-shear chopper, for example, produce satisfactory mixtures of substantially all powder coatings of this particle size. High-speed forces may be required to break down unwanted agglomerates of particles formed on storage and handling of the basic colour powder coating compositions.

A simple example of a suitable high-shear mixer is a modification of the type of food mixer known as a liquidiser. An inlet is arranged in the mixing chamber at about the level of the rotating blade. The inlet is for a high-velocity gas stream, preferably air, to ensure that the powder is kept circulating past the blades. Another example of a suitable high-shear mixer is described in GB Patent 2132128 in which a disintegrator or chopper rotating about a horizontal axis is positioned above a disc rotating about a vertical axis which acts as the main agitator for the mixer. Mixers of this type are sold by Freund Industrial Co. Ltd.

In further examples of suitable high-speed mixers blades of paddles are mounted in a cylinder to rotate about the axis of the cylinder and to scrape the inner surface of the cylinder so that all the powder being mixed is continuously moved around and along the cylinder. The blades can be in the shape of ploughshares to improve mixing of the powder along the length of the cylinder. Chopper blades are mounted about halt way along the cylinder to rotate at right angles to the axis of the cyilnder. Such mixers are sold by Lodige-Morton Machines Ltd. as the "Lodige Ploughshare" mixer or by Winkworth Engineering Ltd. under the trade name "RT Mixer".

Alternatively, comminuting and mixing can be carried out simultaneously by feeding a mixture of basic colour powder coating compositions to a comminuting apparatus such as a fluid energy mill, or by feeding such a mixture in aqueous dispersion to a bead mill or ball mill. There may be problems in cleaning the comminuting apparatus used in this process, particularly if using wet grinding.

In an alternative mixing process the basic colour powder coating compositions are mixed by an electrostatic mixing technique. In this process a powder coating composition in a first basic colour is electrically charged and a powder coating composition in a second basic colour is not charged or is charged to a different potential and the powders are mixed. For example, one powdered coating composition can be electrically charged positively and another powdered coating composition can be electrically charged negatively. Since the charged particles combine with oppositely charged particles or uncharged particles preferentially, electrostatic mixing can produce an agglomerated product approaching a perfect mixture rather than a random mixture. Higher particle sizes can be used with electrostatic mixing than witn other forms of mixing. Particle sizes of up to 20 microns for the basic colour powder coating compositions can be used, although particle sizes in the range 1.5 to 10 microns are preferred. The charged particles can be allowed to combine freely or can be mixed in a pulses electric feed. A suitable apparatus for electrostatic mixing of powders is described by C.L. Tucker and N.P. Suh in "Polymer Engineering and Science", October 1976, Vol. 16, at pages 657 to 663.

When three or more basic colour powder coating compositions have to be mixed to form the required shade they are preferably mixed sequentially when electrostatic mixing is used; two of the basic colour powder coating compositions are mixed and the mixture is mixed with the third basic colour powder coating composition in a subsequent electrostatic mixing step. Alternatively, the three or more basic colour powders can be charged to different potentials and combined in one mixing operation. For example, if three powders are to be mixed. one can be charged positively, one negatively and the third can be uncharged.

If the coating composition has been mixed as a dry powder the mixture is preferably treated to form permanent agglomerates so that segregation of the different colour particles does not occur. The particle size of the agglomerated powder coating is prererably large enough that the material is air fluicisable and can be applied to the substrate by conventional electrostatic spray, i.e. in the range 15–100 microns and preferably 25 to 50 microns. This can be achieved in a number of ways.

A preferred process is granulation, in wnich an added material is used to promote adhesion between the particles. The granulating agent is usually added as a solution. It is important that the solvent does not affect the coating composition. A preferred solvent for the granulating agent is water. The non-volatile constituents in the granulating agent are preferably compatible with the resin in the coating composition. Thus for an acrylic-based powder coating a water-borne acrylic granulating agent can be used, such as Glascol HA2 obtainable from Allied Colloids Ltd. This granulating agent is also suitable for use with thermosetting polyester powder coatings ana has the advantage that it acts as a flow aid when the polyester powder coating is applied to a substrate. The granulating agent for an epoxy-based powder coating can for example be water-based epoxy resin. A water-soluble cellulose ether such as that sold under the Trade Mark "Celacol M20P" is an alternative granulating agent for polyester, acrylic or epoxy resins. The granulating agent can be in the form of a latex, for example a vinyl or acrylic polymer latex. Typically, the amount of granulating agent required is less than 15% by weight, for example 1 to 10% by weight, based on non-volatile solids, to agglomerate powder with mean particle size 5 microns to yield a product of mean size 40 microns.

The granulating agent is preferably introduced as a spray into a mobile mixture. it can for example be so introduced into the apparatus of GB Patent 2132128, or into a "Lodige Ploughshare" or "Winkworth RT" mixer at a position about half way along the mixing cylinder. When the same machine is used for mixing and agglomerating in this way, dry mixing should be carried out before addition of the granulating agent. The high-shear chopper is generally not used during granulation, or is used at a much reduced speed.

An alternative apparatus which can be used for both mixing and granulating is the "Spectrum" sold by T.K. Fielder and Co. Ltd.. This is of the type having a chopper rotating on a vertical plane above an agitator rotating in a horizontal plane. An aqueous granulating agent can be added after mixing, and the apparatus is equipped with microwave generators of a frequency to heat the water added with the granulating agent, thus drying the granulated product.

In an alternative process for introducing the granulating agent, the granulating agent can be encapsulated in particles of the binder resin. An aqueous solution of the granulating agent can be emulsified in a solution of the binder resin in an organic solvent, for example a solution of a polyether binder resin in a chlorinated hydrocarbon such as chloroform. The emulsion is spray-dried to form capsules of the same particle size as the basic colour powder coating composition, for example 1.5 to 10 microns. These capsules are added to the mixed basic colour powder coating compositions either at the start of mixing or ouring mixing. The capsules are gradually broken by the shearing forces used in mixing, releasing the granulating agent solution to cause granulation.

The agglomerated mixture is preferably dried before it is discharged from the mixer to prevent undesired subsequent agglomeration. A drying gas, for example dry air at 25°-80° C., can be passed through the mixer after the granulating agent has been thoroughly mixed into the powder coating composition. The mixing action is preferably continued during drying. Alternatively, the agglomerated mixture can be dried in a fluidised bed dryer after discharge from the mixer.

An alternative method of agglomeration is to use mechanical forces to bind the particles through a process involving deformation and microwelding of the thermoplastic material. A commercially available device for carrying out such mechanical agglomeration is sold as the Nara hybridisation system and described in European Patent Application 224559. Another is sold by Hosokawa Micron B.V. as a "mechano-fusion device". A further apparatus suitable for a mechanical agglomeration is a mill having conical and planar dies as described in International patent application WO-86/04835.

When the basic colour oowder coating compositions are mixed by an electrostatic mixing technique the mixed particles are agglomerated by the attraction of oppositely charged particles. It is, however, generally preferred to supplement this with subsequent more permanent agglomeration. for example by a granulation process or by heat softening.

The basic colour oowder coating compositions can alternatively be mixed and agglomerated by dispersing them together in a liquid dispersion medium followed by drying of the dispersion under conditions causing agglomeration. The liquid dispersion medium is preferably a non-solvent for substantially all the ingredients of the powder coating composition. Water is the preferred dispersion medium, it can be used alone or with a surfactant or water-miscible organic liquid such as an alcohol or an ether alcohol.

The mixing aooaratus used to form the dispersion can use mechanical means. for example a high speed mixer which employs a rotating toothed disc to generate high shear forces, or can use ultrasonic dispersion as well as or in addition to the mechanical disperser. For example, mixing in a high-speed disperser can be followed by ultrasonic dispersion.

The process used to disperse the composition in the liquid dispersion medium may also serve as the final step in comminuting the particles of the powder coating composition to the desires particle size, e.g. to below 10 microns.

The dispersion produced is fed under pressure to the drying apparatus, for example a spray drying apparatus. Spray drying can be carried out using a conventional atomising spray head, in which case the diameter ot the spray head at its narrowest point is preferably 20-500 microns to achieve agglomerated particles of the desired particle size for electrostatic spray, namely 20-50 microns. Spray drying has the advantage that the particle size of the agglomerated powder coating produced can be controlled by the concentration of the dispersion and the diameter of the spray head. The spray can alternatively be a centrifugal spray system, for example a spinning disk spray, or can be an ultrasonic spray. The spray dryer is preferably a co-current dryer in which tne direction of the spray is generally downwards and in which a stream of gas, generally air, passes down the drying chamber in the same general alrection as the spray. This stream of gas is preferably at ambient temperature or above. The inlet temperature of the gas can, for example, be 40°-120° C. The agglomerated powder coating particles produced collect at the bottom of the spray drying chamber and can be removed by a suitable valve system. The vapour of the dispersion medium passes upwards and can be vented. Alternatively, the whole output of the spray dryer can be passed to a cyclone separator to isolate the agglomerated powder coating.

The process of the invention is preferably carried out in conjunction with a data-storage system containing details of the proportions of the basic colour power coating compositions required to make powder coating compositions in different shades, so that for a given shade and size of batch a data processor can calculate the weight of each basic colour powder coating composition to be used. Automatic weighing means can be used if desired. A colour computer can be used if desired to calculate the proportions of basic colour powder coating compositions required to match a sample of a non-standard shade. The basic colour powder coating compositions can be stored at a particle size below 10 microns and mixed and agglomerated as required. Alternatively, the basic colour powder coating compositions can be stored at a higher particle size, for example 15-50 microns as conventionally used for coatings, to be comminuted, mixed and agglomerated as required.

The invention will be further described by way of example with reference to the accompanying diagrammatic drawings identified above.

The apparatus of FIG. 1 generally comprises a mixer 10 and a spray dryer 20. The mixer 10 is a high speed disperser having an impeller 11 mounted on a shaft 12 within a vessel 13. The vessel 13 has an inlet 15 for the dispersion medium, for example water, and an inlet 16 controlled by a valve 17 for feeding the basic colour powder coating compositions. The powder coating particles are dispersed in the dispersion medium and the dispersion thus formed is pumped through an outlet 18 by a pump 19 to a spray dryer 20.

The spray dryer 20 comprises a vessel 21 containing a downwardly directed atomising spray head 22. The spray dried powder coating particles fall to the bottom of the vessel 21 and are removed through an outlet 24 controlled by a valve 25. The vapour of the ciscersion medium which is evaporated passes upwards at the side of the vessel 21 and is vented at 30. Air is fed to the dryer 20 through an inlet 28 and passes in through a heater 29 and down a central duct 33, forming a co-current flow of heated air around the spray head 22.

The apparatus of FIG. 2 as shown is suitable for mixing four basic color powder coating compositions in three mixing steps carred out successively. The apparatus can be adapted to include further mixing steps if required. The apparatus comprises an inlet 41 for a first basic colour powder coating composition whose particles have been positively charged, for example using an apparatus similar to that described in "Polymer Engineering & Science", October 1976 at page 658, and an inlet 42 for a second basic colour powder coating composition whose particles have been negatively charged or are uncharged. The inlet 42 can be sleeved with an insulating material designed to impart a charge to the particles by tribocharging. Polytetrafluoroethylene, for example, will induce a negative charge on the particles. The particles mix at the junction 43 of inlets 41 and 42, and the oppositely charged particles combine. The combined particles pass along conduit 46. An inlet 47 for a third basic colour powder coating composition meets conduit 46 at junction 48. The particles of the third basic colour powder coating composition are preferably oppositely charged to whichever of the first and second basic colour powder coating compositions is present at greater weight, or if the second basic colour powder coating composition is uncharged the particles of the third composition can be negatively charged. The combined particles and the particles of the third basic colour powder coating composition combine at junction 48 and pass to conduit 52, where they are combined with particles of a fourth basic colour powder coating composition supplied through inlet 53 meeting conduit 52 at junction 54. The fourth basic colour powder coating composition is charged oppositely to the net charge of the first three basic colour powder coating compositions. The resulting combined particles pass through conduit 55 and can be collected in a suitable container. This may be the package for the final powder coating composition, or it may be preferred to granulate the product to achieve more secure agglomeration.

Figure 3:
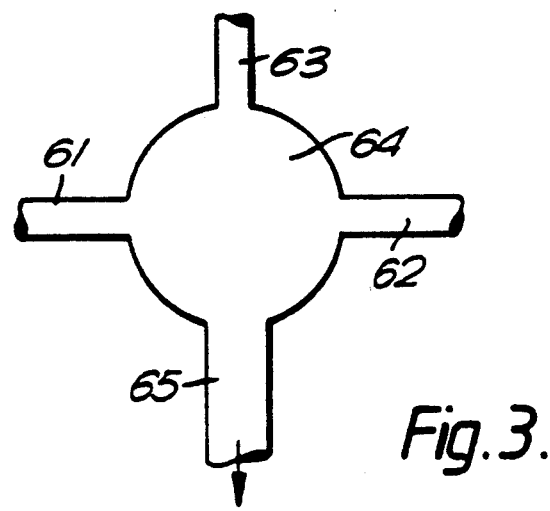
FIG. 3 is a diagrammatic section of an alternative apparatus for mixing basic colour powder coating compositions by electrostatic mixing.

The apparatus of FIG. 3 comprises three inlets 61, 62 and 63 for first, second and third basic colour powder coating compositions. The inlets all feed a mixing chamber 64. The particles of the first basic colour powder coating composition are charged positively; the particles of the second powder coating composition are charged negatively and the particles of the third basic colour powder coating composition are uncharged. The particles combine in mixing chamber 64 and pass to conduit 65, whence they can be collected in a suitable container.

Figure 4:
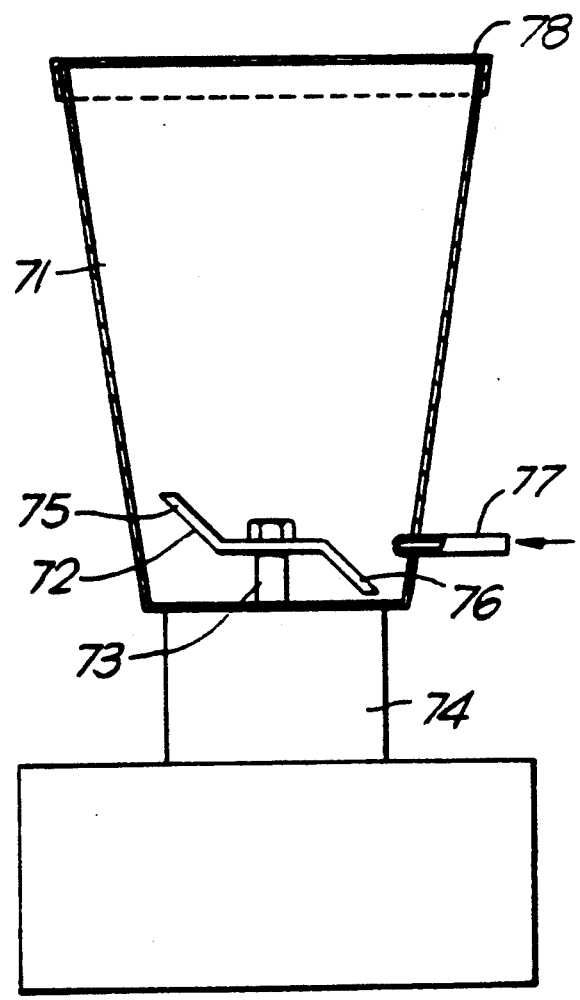
FIG. 4 is a diagrammatic section of a mixer for mechanically mixing basic colour powder coating compositions.

The apparatus of FIG. 4 is a modified "Moulinex" (Trade Mark) food blender and comprises a mixing chamber 71 containing a blade 72 extending in two directions and mounted on a spindle 73. The blade can be rotated at high speed by drive motor 74. The blade 72 has a sharp leading edge in the direction of rotation and has an upwardly inclined portion 75 at one side of the blade and a downwardly inclined portion 76 at the other side of the blade. The inclined portions 75 and 76 of the blade 72 are both tapered so that the tips of the blade 72 are sharp points. An inlet 77 for high-velocity air is positioned in the wall of the chamber 71 substantially at the level of the blade 72. The chamber 71 has a cover 78 which retains the powder coating particles but is porous to air. The cover 78 can for example be of sintered thermoplastic material such as polypropylene or of sintered glass. The combined action of rotation of the blade 72 and the high-velocity air keeps all the powder in the mixing chamber 71 in a substantially fluid state and the high shear action of the blade 72 breaks up any powder agglomerates, which tend to fall into the path of rotation of blade 72 because of their greater weight than the non-agglomerated powder particles.

Figure 5:
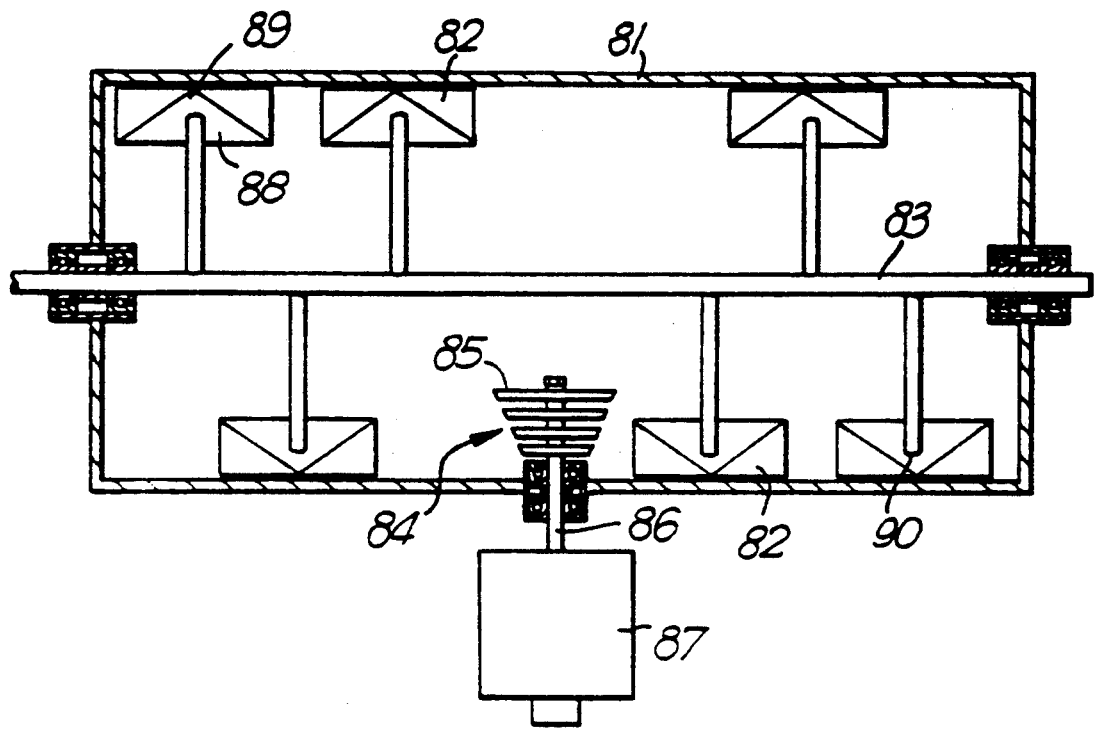
FIG. 5 is a diagrammatic longitudinal section of an alternative mixer for mechanically mixing basic colour powder coating compositions.

The apparatus of FIG. 5 comprises a cylindrical mixing chamber 81 containing blades 82 mounted on a drive shaft 83, which in use is rotated by a motor (not shown). A chopper 84 consisting of a set of cutting blades 85 mounted on a spindle 86 is situated half way along the mixing chamber 81. The spindle 86 is driven by a motor 87 to rotate the cutting blades 85. The blades 82 are shaped with a leading edge 88 tapered in two dimensions to a point 89 to promote mixing of powders along the chamber 81. The trailing edge 90 of the blades 82 is also tapered but not to a point.

Figure 6:
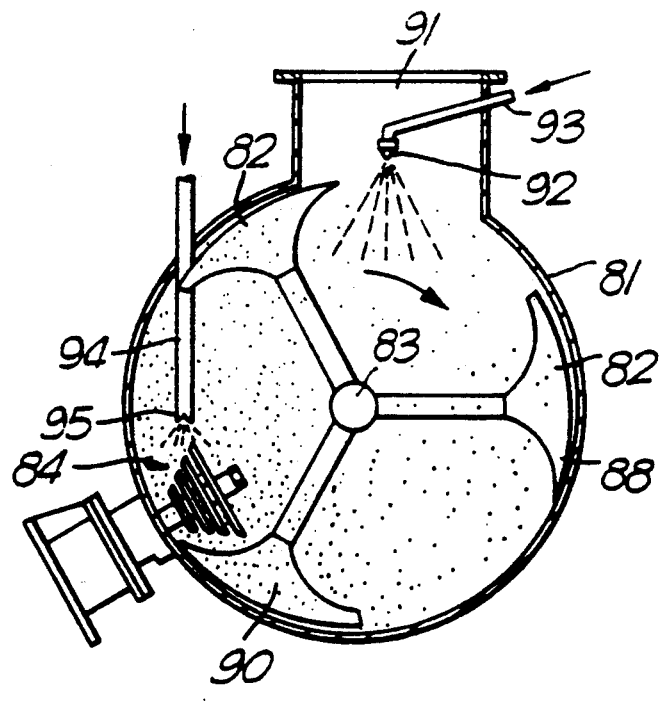
FIG. 6 is a diagrammatic cross-section of the mixer of FIG. 5 adapted to carry out granulation after mixing.

The apparatus of FIG. 6 is a modification of the apparatus of FIG. 5 and the same parts have the same numerals. The apparatus includes two types of inlet for a solution of granulating agent. The mixing chamber 81 is modified to include a top zone 91 within which are located a series of spray heads such as 92 fed by a pipe 93 so that the spray heads 92 are outside the path of rotation of the blades 82. A further inlet 94 is positioned about half way along the mixing chamber 81 and has its outlet 95 adjacent to the blades 85 of chopper 84.

In use the apparatus of FIG. 6 is charged with the required amount of basic colour powder coating compositions of particle size below 10 microns and is operated as a dry mixer initially. When sufficient mixing time has elapsed to obtain a random mixture of particles a granulation agent is introduced through inlets 93 and 94 and the mixing action is continued to obtain agglomerated composite particles. After addition of the granulating agent is complete, warm dry air is fed to the mixing chamber 81 through inlets 93 and 94 to gradually dry the powder as it is being agglomerated, limiting the size of the composite particles formed.

Figure 7:
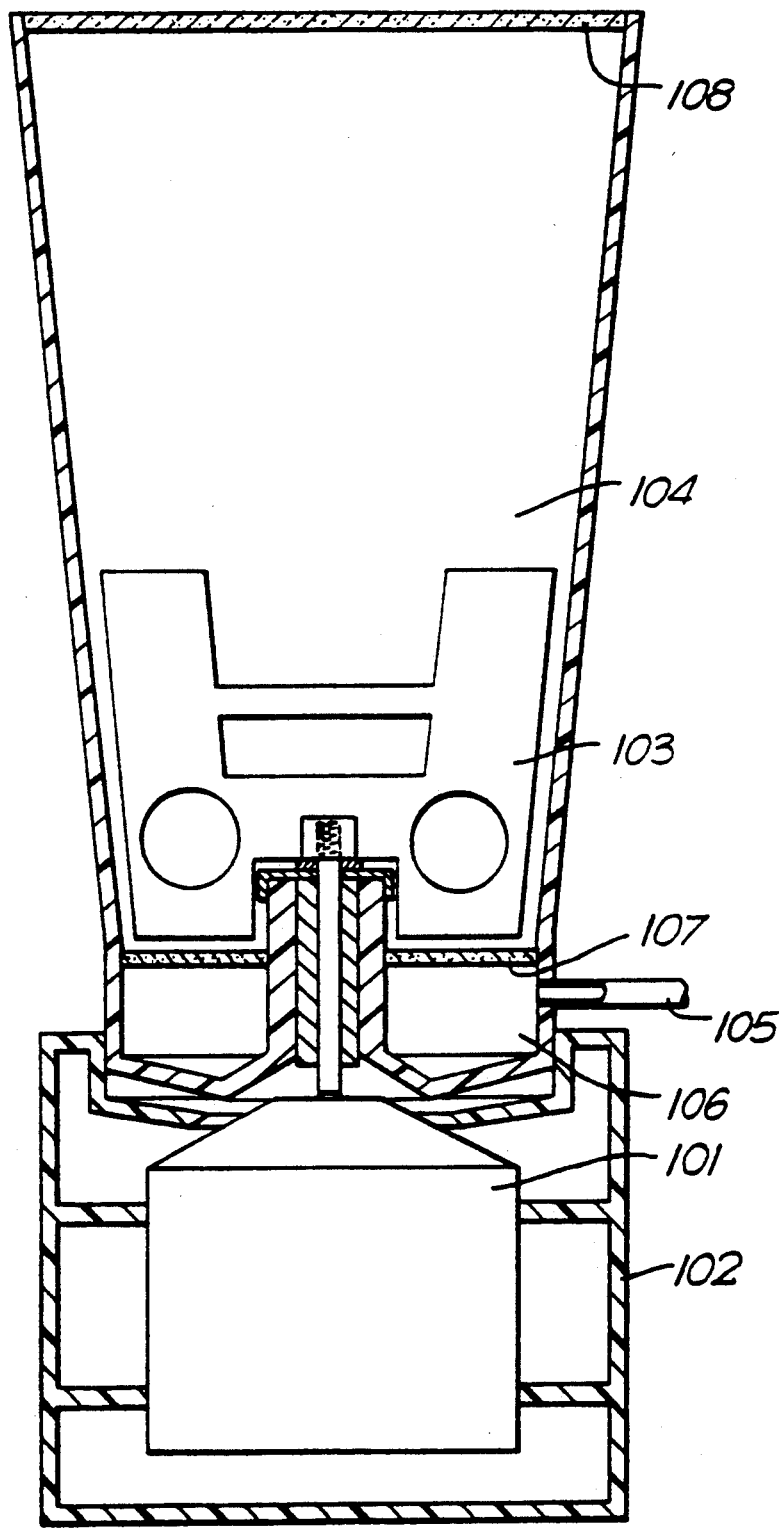
FIG. 7 is a diagrammatic cross-section of an apparatus for mixing and/or granulating basic colour powder coating compositions.

The apparatus of FIG. 7 is a modified "Kenwood A516/517" (Trade Mark) food mixer and comprises a motor 101, contained in a housing 102, which drives a stirrer blade 103 within a mixing chamber 104. An air inlet 105 leads to an inlet chamber 106, separated from the mixing chamber 104 by a glass sinter 107. High-velocity air can be fed to the inlet 105 to fluidise the powdered material in the chamber 104 and warm air can be fed to cause drying during granulation. The product is prevented from escaping during mixing or granulation by a second sintered screen 108 which separates product from exhaust air.

The invention is illustrated by the following Examples.

EXAMPLES 1 AND 2

White, yellow, blue and black basic colour powder coating compositions were prepared by mixing the following formulations. In each case the ingredients were dry mixed and fed to an extruder blender operating at a temperature of 100° C. The extruder produced a sheet of pigmented resin which was ground to a particle size of below 100 microns, dispersed at 35% by weight in water with 0.1% surfactant and circulated through a high-speed bead mill (Eiger mini mill) at 500 rpm in batches of 100 ml for 30 minutes each. The particle size of the product was all below 10 microns, with the majority of the powder being in the size range 1 to 4 microns. The dispersions produced were dried to form the basic colour powder coating compositions. The fillers, polyester resin curing agent and flow modifiers used were the same in each of the four compositions.

| White Powder Coating Composition | |
|---|---|
| Rutile titanium dioxide white pigment | 250 g |
| Fillers (barytes and talc) | 200 g |
| Carboxylic acid-functional polyester resin | 268 g |
| Epoxy resin curing agent | 268 g |
| Flow modifiers | 14 g |
| Yellow Powder Coating Composition | |
| "Graphitol" yellow pigment | 150 g |
| Titanium dioxide white pigment | 100 g |
| Fillers | 200 g |
| Carboxylic acid-functional polyester resin | 268 g |
| Epoxy resin curing agent | 268 g |
| Flow modifiers | 14 g |
| Blue Powder Coating Composition | |

| -continued | |
|---|---|
| "Heliogen" blue pigment | 150 g |
| Titanium dioxide white pigment | 100 g |
| Fillers | 200 g |
| Carboxylic acid-functional polyester resin | 268 g |
| Epoxy resin curing agent | 268 g |
| Flow modifiers | 14 g |
| Black Powder Coating Composition | |
| Black pigment | 30 g |
| Fillers | 200 g |
| Carboxylic acid-functional polyester resin | 377 g |
| Epoxy resin curing agent | 377 g |
| Flow modifiers | 14 g |

For Example 1 50% by weight of the white powder coating composition and 50% by weight of the black powder coating composition were ball milled together at a concentration of 35% by weight in water containing 0.1% surfactant to form a slurry. The slurry was spray dried using an inlet air temperature of 112° C. and an exhaust temperature of 50° C.

The spray dried powder was electrostatically sprayed onto steel panels using conventional apparatus for applying powder coatings. The coated steel sheet was stoves at 200° C. for 20 minutes. The coating produced appeared to the eye to have a uniform grey colour.

For Example 2 the process of Example 1 was repeated using 56% by weight of the yellow powder coating composition and 44% by weight of the blue powder coating composition in place of the white and black powders. The cured powder coating appeared to the eye to have a uniform green colour.

EXAMPLE 3

White and black powder coating compositions having the formulation given in Examples 1 and 2 and of mean particle size 45 microns were each jet milled using a Gueso M100 series Jet Mill at air pressure 800 kpa and powder feed pressure 200 kpa to below 5 microns particle size. The black product had 100% below 4.8 microns and 50% by weight below 2.9 microns. The white product was 100% below 6.2 microns and 99% below 4.8 microns.

50% by weight each of the white and black powders were mixed for 10 minutes in a mixer according to FIG. 4. The powders were initially treated in a dry state until well mixed and fluidised. While the mixed powder was in fluidised form, Allied Colloids Glascol HA2 granulating agent (30% solution in water) was added from a spray head. The amount of granulating agent added was 3.0% on a dry weight basis. Mixing was continued at reduced speed for 15 minutes to cause granulation while dry air at 30° C. was fed to dry the mixture as it agglomerated. A final high-speed mixing with continued drying for 5 minutes produced an agglomerated grey powder of mean particle size 35 microns with substantially all the particles in the size range 15 to 120 microns.

The agglomerated powder was sprayed on panels and cured as described in Example 1 to produce a coating of uniform grey appearance.

Using the process of Example 3 it has been found that for a 1:1 mixture of black and white particles the critical size is 2.5 microns for a random mixture. If however the mixture is a perfect alternating array of black and white particles the critical size is above 20 microns. The sensitivity of critical size on going to non-pertect mixtures can be accounted for by the statistical probability of the same colour particles lying adjacent to one another.

For random 1:1 mixtures of blue and yellow particles, the critical size is also about 2.5 microns, although this rises to 5.5 microns for 9:1 mixtures of blue and yellow and to 3.3 microns for 1:9 mixtures. For random 1:1 mixtures of red and yellow particles the critical size is 3.5 microns, rising to about 5.0 microns for 9:1 and 1:9 mixtures; mixtures of red and blue particles give similar results. Mixtures of white and yellow particles have a critical size in the range 10 to 15 microns. Mixtures having three or more coloured components generally have a critical size which is similar to or larger than that of mixtures of two of the components.

EXAMPLES 4 AND 5

The powder coatings, each based on a carboxy-functional polyester and an epoxy curing agent, sold by International Paint Ltd., under the Trade Marks "Interpon D White Gloss". "Interpon D Gloss Carmine" (red) and "Interpon D Gloss Ultramarine" (blue) were milled in a jet mill to give basic colour powder coating comoositions in which all the oarticies were below 4.8 microns and 50% by weight were below 2.9 microns. For Example 4, 50 g red milled powder and 50 g white were mixed in the apparatus of FIG. 4.

100 g of the mixed material was loaded into chamber 104 of the apparatus of FIG. 7. Whilst stirring at 300 rpm. 30 g of granulating agent solution (30% solids Glascol HA2) was introduced into the chamber 104 as a fine spray over 10 minutes. Mixing was maintained at a motor speed of 300 rpm while drying the product by passing dry air at 50° C. into inlet chamber 106. After 1 hour a dry free-flowing pink powder was formed. This was found to have a particle size distribution in which 50% by weight was below 48 microns. 90% by weight was below 108 microns and 94% by weight was above 15 microns.

This powder was applied to a steel substrate using an electrostatic spray gun and cured at the recommended storing schedule for "Intercon D". A smooth pink coating, homogeneous to the eye, was produced.

In Example 5 the white milled powder was replaced by 50 g blue milled powder; the process of Example 4 was otherwise repeated exactly. The particle size of the agglomerated product was similar to that of the product of Example 4 and it could be applied to a substrate and used to form a smooth, visually homogeneous, purple coating.

We claim:

1. A process for the preparation of a coloured powder coating composition in a desired colour, characterized by providing powder coating compositions in at least two basic colours, optionally together with an uncoloured powder coating composition, each composition consisting of solid particles and each particle comprising a solid polymeric binder system comprising a film-forming resin, the particles of each of the basic colour compositions also containing at least one colouring agent, and comminuting the compositions and mixing them and wherein the particle sizes and proportions of the compositions mixed are such that when applied to a substrate and heated to form a continuous coating a film of the desired colour is formed in which the differences in colour arising from the different particles cannot be discerned by the human eye, wherein the mixed particles are agglomerated to produce composite particles such that the composition is air fluidisable and can be applied to the substrate by electrostatic spray.

2. A process for the preparation of a coloured powder coating composition in a desired colour, characterized by providing powder coating compositions in at least two basic colours, optionally together with an uncoloured powder coating composition, each composition consisting of solid particles and each particle comprising a solid polymeric binder system comprising a film-forming resin, the particles of each of the basic colour compositions also containing at least one colouring agent, comminuting the compositions to a particle size such that substantially all the particles have their largest dimension below 20 microns, and mixing the powder coating compositions in proportions selected to give a coloured powder coating composition which when applied to a substrate and heated to form a continuous coating forms a film of the desired colour, wherein the mixed particles are agglomerated to produce composite particles of a mean particle size of 15 to 75 microns.

3. A process for the preparation of a coloured powder coating composition in a desired colour, characterized by providing powder coating compositions in at least two basic colours, optionally together with an uncoloured powder coating composition, each composition consisting of solid particles and each particle comprising a solid polymeric binder system comprising a film-forming resin, the particles of each of the basic colour compositions also containing at least one colouring agent, and comminuting the compositions to a particle size such that substantially all the particles have their largest dimension below 10 microns and simultaneously mixing them in proportions selected to give a coloured powder coating composition which when applied to a substrate and heated to form a continuous coating forms a film of the desired colour, wherein the mixed particles are agglomerated to produce composite particles of a mean particle size of 15 to 75 microns.

4. A process according to claim 1 wherein the maximum dimension of at least 99% by weight of the particles prior to agglomeration is in the range 0.5 to 15 microns.

5. A process according to claim 1 wherein the mean particle size of the composite particles is in the range of 15 to 75 microns and wherein the composite particles each comprises a mixture of particles of at least two different colours.

6. A process according to claim 1, wherein the size of substantially all the particles is in the range of 1.5 to 10 microns in the largest dimension.

7. A process according to claim 1, wherein the powder coating compositions in basic colours and optical uncoloured composition if present are mixed as dry powders, and a solution of a granulating agent is added to the mixed powder to agglomerate the particles.

8. A process according to claim 1, wherein the powder coating compositions in basic colours and optical uncoloured composition if present are mixed as dry powders, and the particles are subjected to mechanical forces sufficient to cause agglomeration of particles by fusion.

9. A process according to claim 1, wherein the powder coating compositions in basic colours are dispersed together in a liquid dispersion medium and the dispersion is dried under conditions causing agglomeration.

10. A powder coating composition prepared by a process according to claim 1.

11. A process for the preparation of a coloured powder coating composition in a desired colour, characterized by providing powder coating compositions in at least two basic colours and optionally also in uncoloured form, each composition consisting of solid particles and each particle comprising a solid polymeric binder system comprising a film-forming resin, and in the case of each of the basic colour compositions also at least one colouring agent, comminuting the compositions to a particle size such that substantially all the particles have their largest dimension below 20 microns, and mixing and agglomerating the said powder coating compositions by an electrostatic mixing technique in which a powder coating composition in a first basic colour is electrically charged and a powder coating composition in a second basic colour is not so charged or is charged to a different potential and the powders are mixed to form composite particles of mean particle size 25 to 75 microns, which when applied to a substrate and heated to form a continuous coating form a film of the desired colour.

12. A rocess for the preparation of a coloured powder coating composition in a desired colour, characterized by providing powder coating compositions in at least two basic colours, optionally together with an uncoloured powder coating composition, each composition consisting of solid particles and each particle comprising a solid polymeric binder system comprising a film-forming resin, the particles of each of the basic colour compositions also containing at least one colouring agent, and comminuting the compositions to a particle size such that substantially all the particles have their largest dimension below 20 microns and mixing the compositions in proportions selected to give a coloured powder coating composition which when applied to a substrate and heated to form a continuous coating forms a film of the desired colour.

* * * * *